Dec. 1, 1953  J. A. LAUCK  2,660,958
PRESSURE LOADED GEAR PUMP
Filed Aug. 11, 1950
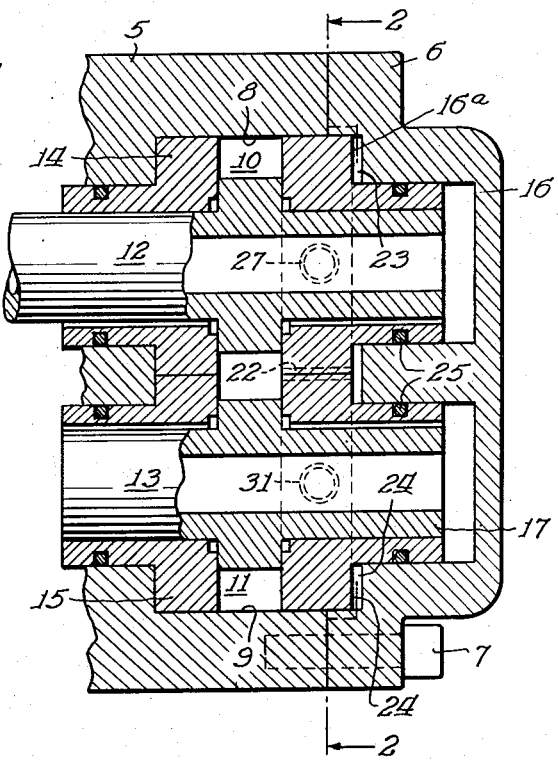
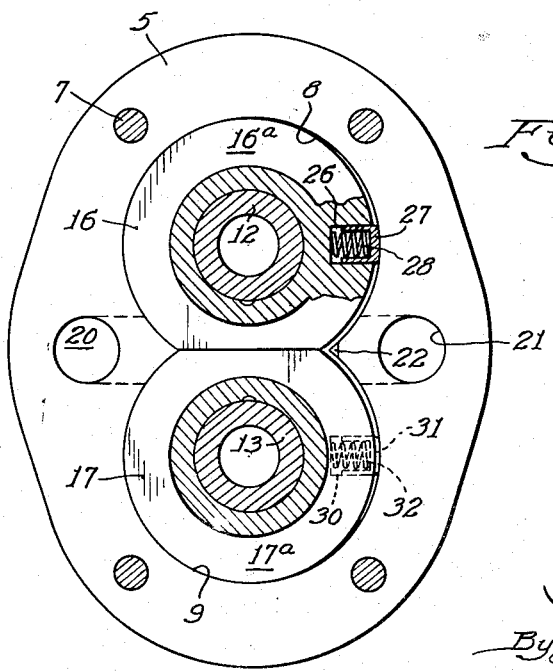
Inventor:
John A. Lauck Patented Dec. 1, 1953

2,660,958

UNITED STATES PATENT OFFICE 2,660,958

PRESSURE LOADED GEAR PUMP

John A. Lauck, Shaker Heights, Ohio, assignor to Borg-Warner Corporation, Chicago, Ill., a corporation of Illinois Application August 11, 1950, Serial No. 178,925

5 Claims. (Cl. 103—126)

1

This invention relates to pressure loaded gear pumps and more particularly to an arrangement for insuring proper location of the pressure loadable bushings in a pressure loaded type intermeshing gear pump.

In a pressure loaded, intermeshing gear type pump having one or more sets of axially movable, pressure loadable bushings, a part of the output or discharge pressure of the pump is applied to the rear or motive surfaces of the axially adjustable bushings to urge these bushings into sealing engagement with their associated gears. As disclosed in U. S. Patent No. 2,420,622 to Roth et al., by carefully selecting the relative areas of the forward surfaces of the bushings and of the motive surfaces of the bushings, it is possible to control within very close limits the actual sealing pressure provided. In practice, this requires a somewhat higher effective pressure in the direction of establishing the seal than in the direction tending to open the seal.

Because the pressure loadable bushings must be made movable, a certain minimum clearance must be provided between the sides of the bushings and the adjacent sides of the chambers or bores in the pump housing in which the bushings are received. In practice, this clearance is actually very slight but it has been found that since the bushings may move either to one side or to the other of the chamber during assembly, occasionally a pump will be made in which the clearance of the bushings adjacent the inlet side of the pump is large enough, because of the corresponding reduction in clearance adjacent the discharge side of the pump, which is maintained during the operation of the pump by the shifted alignment of the housing cover section as assembled, to provide a substantial leakage path to inlet pressure. This, of course, reduces materially the efficiency of the pump.

As disclosed in the earlier filed application of James A. Compton, Serial No. 174,606, filed July 19, 1950, it is possible to prelocate the bushings in the pump by employing shims which are used during an initial assembly step to force the bushings toward the inlet side of the pump and then assembling the cover housing section on the pump body section, omitting the usual sealing means. Then with the parts held rigidly in position, a dowel hole is drilled through the flanged mating portions of the two housing sections. Thereafter the pump is disassembled, the shims removed, the usual sealing rings inserted and the pump reassembled with a dowel pin inserted in the drilled hole. The dowel pin maintains the position of the bushings established by the shims when the pump housing sections are finally bolted together. This arrangement works very satisfactorily but where after assembly it becomes necessary to replace the bushings in the pump, then the advantages of the invention are substantially lost. Also, this method of assembly reduces materially the interchangeability of the pump parts, an important feature to the armed services.

An object of the present invention is to provide a new and improved pressure loaded type, intermeshing gear pump incorporating means for insuring location of the pressure loadable bushings adjacent the inlet side of the pump.

In accordance with one embodiment of this invention, a pressure loaded, intermeshing gear type pump having at least one set of bushings axially movable and pressure loadable, has associated with the flanged portions of each of the pressure loadable bushings a radially disposed, spring-pressed plunger or detent so located as to urge the flanged portion of the bushings toward the inlet side of the pump, thereby shifting the cover section of the pump housing toward the inlet side so that when tightened in place, the cover will maintain the shifted position of the bushings. The spring plungers may be provided either in the flanged portions of the bushings or carried in suitable recesses formed in the housing.

Other objects and advantages of the present invention will be apparent from the following detailed description thereof taken in conjunction with the drawings wherein:

Fig. 1 is a fragmentary, axial, sectional view of a pressure loaded type, intermeshing gear pump constructed in accordance with one embodiment of this invention;

Fig. 2 is a transverse, enlarged, sectional view taken substantially along the line 2—2 of Fig. 1 and showing to advantage the arrangement of the spring-pressed plungers.

Referring now to the drawings and particularly to Fig. 1 thereof, a pump generally similar to that shown in the aforementioned Roth et al. patent is illustrated comprising a sectional housing having a main body portion 5 and a right closure member or cover member 6. These sections are normally bolted together as by the bolts 7 and cooperate to define therewithin a pair of parallel axes, intersecting bores or pumping gear chambers 8 and 9 which are arranged to receive in complementary relationship intermeshing pumping gears 10 and 11, respectively. In the embodiment illustrated, the pumping gears have integrally formed therewith hollow journal shafts 12 and 13, respectively, and the left portions of the journal shafts 12 and 13 are received in conventional flanged bushings 14 and 15 mounted in the left portions of the pumping gear chambers 8 and 9. The right portions of the gear journals are received, respectively, in axially adjustable, pressure loadable flanged bushings 16 and 17 mounted in the right side of the pumping gear chambers.

In the embodiment illustrated, the upper pumping gear 10 is the driving gear and is rotated in a clockwise direction, as viewed in Fig. 2. In accordance with conventional pump design practice, the journal shaft of the upper gear may be extended to the left, as viewed in Fig. 1, and coupled to a suitable power source. Low pressure liquid is introduced into the pump housing at inlet 20 formed in the left side of the pump housing, as viewed in Fig. 2, and high pressure liquid is discharged from the pump housing, through outlet 21 formed in the right side of the housing, the inlet and outlet ports communicating with the inlet and discharge areas of the intermeshing pumping gears. The pressure loadable bushings are normally fitted into the bores with sufficient clearance to permit slight axial movement of the bushing with respect to the bores to establish the desired, pressure loaded seal during operation of the pump.

In the operation of a pump of this type, discharge pressure generated by the intermeshing gears may be communicated from the outlet or discharge side thereof to the annular pressure loading areas, designated 16a and 17a in the drawings and located at the back of the bushings, through an axially extending passage 22 formed between the peripheries of the flanged portions of the bushings on the discharge side of the pump at the point of convergence of the flanged portions of the bushings. Areas 16a and 17a cooperate with the adjacent walls of the housing bores 8 and 9 and the peripheries of the barrel portions of the bushings 16 and 17 to define annular pressure loading chambers 23 and 24, respectively. The passage 22 extends from the discharge side of the gears to the right, as viewed in Fig. 1, to the intercommunicating portions of the pressure loading chambers 23 and 24 at their point of juncture.

Escape of pressure rearwardly from the pressure loading surfaces is substantially prevented by means of an O-ring seal 25 disposed about the periphery of the rear or barrel portions of each bushing in a suitable annular groove formed in the periphery of the bushing or in the adjacent bore wall. Pressure leaking past the O-ring seal may be vented to inlet pressure or to a zone of intermediate pressure in accordance with conventional pressure loaded pump practice as set forth in the above-referenced Roth et al. patent.

Since it is necessary in order to permit the slight axial movement required of the bushings in order to establish a seal, to fit the bushings with some clearance in the bushing receiving chambers the bushings may actually be assembled in such manner that more clearance is provided adjacent the inlet side of the pump than adjacent the discharge side of the pump, that is to say that the axially movable bushings may be slightly off-centered with respect to the axis of the bushing receiving chambers and located somewhat nearer the discharge port than the inlet port. Thus, for example, the bushings might be assembled so as to have metal to metal contact with the discharge side of the pump housing inner wall and then when the cover section is assembled thereon and bolted in position, the bushings are thereafter maintained in metal to metal contact with the discharge side so that despite the generation of pressure on the discharge side of the pump, which would otherwise move the bushings toward the inlet side of the pump, the bushings are held transversely immovable by the cover and a leakage path exists adjacent the inlet side. Since, in the operation of the pump, the pressure applied to the pressure loading chambers 23 and 24 is substantially equivalent to discharge pressure, the leakage path provided by the excessive clearance occurring when the bushings are positioned nearer the discharge port than to the inlet port may be sufficient to materially reduce the efficiency of the pump. For example, tests have indicated that at discharge pressures on the order of 5,000 p. s. i., a leakage passage of .005 diameter will reduce pump output up to fifty per cent.

It has been found in accordance with the present invention that this undesirable condition may be substantially eliminated by providing means for establishing during assembly the location of the bushings in the pump housing in such manner that the clearance adjacent the inlet side of the pump is thereafter held to a minimum during the operation of the pump.

Referring now particularly to Fig. 2, it will be seen that a cylindrical recess 26 is formed in the right side of the flanged portion of the upper pressure loadable bushing, the recess being located substantially midway between the upper and lower sides of the bushing and having its axis extending at right angles to the vertical center line of the pump, that is, radially of the bushing. In this recess is slidably journalled a hollow, piston-like member or plunger 27 having its head protruding slightly from the opening of the recess and bearing against the adjacent inner side wall of the pump housing, this right side wall being on the discharge side of the pump. A spring 28, which may be of helically coiled or spiral type, is disposed in the recess 26 and its left end bears against the base of the recess while its right end bears against the inner side of the head of piston 27. In this manner the piston head is pressed against the side of the housing wall and by virtue of the reaction force of the spring, the bushing itself is urged in the opposite direction, thus seating the left side of the periphery of the flanged portion of the bushing tightly against the side of the housing adjacent the inlet side of the pump. The tension of spring 28 must be selected, of course, to provide the requisite sealing force. Preferably, the head of the piston is bevelled or slightly rounded so that the frictional engagement thereof with the side of the housing wall is minimized insofar as feasible, to prevent interference with the axial movement of the bushing in the operation of the pump.

From the foregoing, it will be evident that by constructing a pump in accordance with this invention, the possibility of erratic alignment of the pressure loadable bushings is eliminated and more particularly, proper positioning of the bushings adjacent the inlet side of the pump is assured during the assembly of the pump and maintained during the operation of the pump by the shifted alignment of the cover section of the pump housing.

A similar arrangement is provided for the lower pressure loadable bushing, there being a recess 30, a piston 31 and a spring 32 arranged similarly to the loading device illustrated in conjunction with the upper bushing.

While a single piston member has been illustrated in conjunction with each bushing and located substantially on a horizontal center line intersecting the axis of each bushing, it will be evident that the location of the piston assembly may be varied and that more than one locating piston may be employed. Also, while in general less convenient, the piston assembly could be carried in the pump housing wall rather than in the bushings.

Where herein the various parts of this invention have been referred to as being located in a right or a left position, or an upper or a lower position, it will be understood that this is done solely for the purpose of facilitating description and that such references relate only to the relative positions of the parts as shown in the accompanying drawings.

While but one embodiment of this invention has been shown and described, it will be evident that many changes and modifications may be made therein without departing from the spirit or scope of the present invention.

What is claimed is:

1. A pressure loaded type intermeshing gear pump including a housing having a pair of pumping chambers formed therein and an inlet port formed on one side of said housing and communicating with said pumping chambers and an outlet port formed on an opposite side of said housing and communicating with said chambers, intermeshing pumping gears disposed in said chambers and bushings associated with each of said pumping gears, at least one of said bushings being axially movable in response to application of discharge pressure to the rear surface thereof to engage the associated gear side face in sealing relation, and resilient means associated with said axially movable bushing for urging said bushing in a direction substantially normal to the axis of rotation of said pumping gears toward the inlet side of said pump during the assembly of said pump.

2. A liquid pump comprising a housing having a pump chamber and an inlet leading to and an outlet leading from said pump chamber, means including a rotatable member received in said pump chamber for forcing fluid from said inlet out of said housing through said outlet, and end plate in said pump chamber having a back face normally spaced from the adjacent end wall of said chamber and having portions cooperable with said housing to provide a pressure chamber, said end plate also having a front face subject to the pressures in said pump chamber and cooperable with the adjacent side face of said rotatable member to provide a pumping seal therewith, one of said last two mentioned faces having a relief recess formed therein inwardly of its outer periphery to limit the sealing area between the side face and said front face, means establishing communication between said relief recess and said inlet, means establishing communication between said pressure chamber at the back face of said end plate and said outlet, the relation of the area of said back face to said sealing area being such that the force acting upon said back face of said end plate always exceeds slightly the force acting upon the front face of said end plate, whereby to maintain said pumping seal without excessive friction, wear or loss of volumetric efficiency, and resilient means associated with said end plate arranged to provide a force acting generally at right angles to the axial force acting on said back face during operation of said pump to shift said end plate toward the inlet side of said housing at least during the assembly of said pump thereby to reduce leakage between the periphery of said end plate and the adjacent inner wall of said housing on the inlet side of said pump during operation of said pump.

3. A pressure loaded type intermeshing gear pump, comprising a pump housing having an inlet port formed in the inlet side thereof and an outlet port formed in the outlet side thereof, said housing having a pumping chamber formed therein communicating with said two ports, a pumping gear in said chamber for forcing fluid entering said chamber from said inlet port out of said chamber through said outlet port, a side face on said pumping gear adapted to be engaged by a forward surface of said bushing, a pressure loadable bushing adapted to engage said side face in sealing relation and located in said chamber, means for communicating pressure generated by said pump to a rear surface of said bushing to urge said bushing into said sealing relation, and means associated with said pressure loadable bushing for urging said bushing toward the inlet side of said pump during assembly of said pump and substantially normal to the movement of said bushing in response to pressure generated by said gears.

4. A pump in accordance with preceding claim wherein said means for urging the bushing toward the inlet side of the pump and normal to the movement of said bushing in response to pressure generated by said gears is a spring pressed means.

5. A pump in accordance with claim 3 wherein said means for urging said bushing toward the inlet side of said pump and normal to the movement of said bushing in response to pressure generated by said gears comprises a spring pressed plunger carried in a recess formed in said bushing and adapted during assembly of said pump to shift said bushing toward the inlet side thereof.

JOHN A. LAUCK.

References Cited in the file of this patent

UNITED STATES PATENTS

| Number | Name | Date |
| --- | --- | --- |
| 1,880,108 | Ross | Sept. 27, 1932 |
| 2,312,891 | Ferris | Mar. 2, 1943 |
| 2,420,622 | Roth et al. | May 13, 1947 |
| 2,472,031 | Wichorek | May 31, 1949 |
| 2,544,987 | Gardiner et al. | Mar. 13, 1951 |
| 2,544,988 | Gardiner et al. | Mar. 13, 1951 |